US007386039B2

(12) United States Patent
Afzal

(10) Patent No.: US 7,386,039 B2
(45) Date of Patent: Jun. 10, 2008

(54) METHOD AND APPARATUS FOR IDENTIFYING FAULTS IN A BROADBAND NETWORK

(75) Inventor: Muhammad Akbar Khan Afzal, Elk Grove Village, IL (US)

(73) Assignee: Tollgrade Communications, Inc., Wilmington, DE (US)

( * ) Notice: Subject to any disclaimer, the term of this patent is extended or adjusted under 35 U.S.C. 154(b) by 619 days.

(21) Appl. No.: 10/672,821

(22) Filed: Sep. 26, 2003

(65) Prior Publication Data
US 2005/0069029 A1    Mar. 31, 2005

(51) Int. Cl.
*H04B 1/38* (2006.01)
*H04B 17/00* (2006.01)
*H04M 1/24* (2006.01)

(52) U.S. Cl. .................... 375/222; 375/224; 379/27.01

(58) Field of Classification Search ........ 375/222–228, 375/260; 370/201, 241, 242–253; 379/1.01, 379/26.01, 27.01, 32.04
See application file for complete search history.

(56) References Cited

U.S. PATENT DOCUMENTS

| | | | |
|---|---|---|---|
| 3,882,287 A | 5/1975 | Simmonds |
| 4,087,657 A | 5/1978 | Peoples |
| 4,186,283 A | 1/1980 | Simmonds |
| 4,529,847 A | 7/1985 | DeBalko |
| 4,620,069 A | 10/1986 | Godwin et al. |
| 4,868,506 A | 9/1989 | DiStefano |
| 5,025,221 A | 6/1991 | Blaess |
| 5,083,086 A | 1/1992 | Steiner |
| 5,121,420 A | 6/1992 | Marr et al. |
| 5,128,619 A | 7/1992 | Bjork et al. |
| 5,157,336 A | 10/1992 | Crick |
| 5,270,661 A | 12/1993 | Burnett |
| 5,302,905 A | 4/1994 | Crick |
| 5,319,311 A | 6/1994 | Kawashima et al. |

(Continued)

FOREIGN PATENT DOCUMENTS

EP    0722164 A1    7/1996

(Continued)

OTHER PUBLICATIONS

Salvekar, Atul A., et al., "Crosswalk Profile Detection for use in Multiuser Detection," *IEEE*, 2001, 2171-2175, 0-7803-7097-1/01.

(Continued)

*Primary Examiner*—Don N Vo
(74) *Attorney, Agent, or Firm*—The Webb Law Firm

(57) ABSTRACT

A system for identifying service affecting conditions on a subscriber line in the access portion of a broadband network, particularly an ADSL network. A measurement unit provides information on the line that aids in identifying projected performance. Information from a modem on the subscriber line indicative of actual performance is obtained and compared to the predicted values. Deviations are used to identify service affecting conditions and, depending on the nature of the deviations, the type of condition affecting service on the line. The physical measurements are used to identify the length of the subscriber line. Modem information is obtained through the MIB and allows determination of the bit loading on the line. Interference sources are identified by comparing the actual bit loading to bit loading expected for a line corresponding to the measured length.

27 Claims, 4 Drawing Sheets

U.S. PATENT DOCUMENTS

| | | | |
|---|---|---|---|
| 5,400,321 A | 3/1995 | Nagato | |
| 5,402,073 A | 3/1995 | Ross | |
| 5,404,388 A | 4/1995 | Eu | |
| 5,436,953 A | 7/1995 | Nilson | |
| 5,461,318 A | 10/1995 | Borchert et al. | |
| 5,465,287 A | 11/1995 | Egozi | |
| 5,528,661 A | 6/1996 | Siu et al. | |
| 5,528,679 A | 6/1996 | Taarud | |
| 5,606,592 A | 2/1997 | Galloway et al. | |
| 5,629,628 A | 5/1997 | Hinds et al. | |
| 5,636,202 A | 6/1997 | Garney | |
| 5,680,391 A | 10/1997 | Barron et al. | |
| 5,699,402 A | 12/1997 | Bauer et al. | |
| 5,758,027 A | 5/1998 | Meyers et al. | |
| 5,790,523 A | 8/1998 | Ritchie, Jr. et al. | |
| 5,864,602 A | 1/1999 | Needle | |
| 5,870,451 A | 2/1999 | Winkler et al. | |
| 5,881,130 A | 3/1999 | Zhang | |
| 5,937,033 A | 8/1999 | Bellows | |
| 5,956,386 A | 9/1999 | Miller | |
| 5,978,449 A | 11/1999 | Needle | |
| 6,002,671 A | 12/1999 | Kahkoska et al. | |
| 6,014,425 A | 1/2000 | Bingel et al. | |
| 6,026,145 A | 2/2000 | Bauer et al. | |
| 6,084,946 A | 7/2000 | Beierle | |
| 6,091,338 A | 7/2000 | Natra | |
| 6,091,713 A | 7/2000 | Lechleider et al. | |
| 6,107,867 A | 8/2000 | Lakshmikumar | |
| 6,111,861 A | 8/2000 | Burgess | |
| 6,115,466 A | 9/2000 | Bella | |
| 6,118,860 A | 9/2000 | Hillson et al. | |
| 6,154,447 A | 11/2000 | Vedder | |
| 6,169,785 B1 | 1/2001 | Okazaki | |
| 6,177,801 B1 | 1/2001 | Chong et al. | |
| 6,181,775 B1 | 1/2001 | Bella | |
| 6,192,109 B1 | 2/2001 | Amrany et al. | |
| 6,205,202 B1 | 3/2001 | Yoshida et al. | |
| 6,209,108 B1 | 3/2001 | Pett et al. | |
| 6,215,854 B1 | 4/2001 | Walance | |
| 6,215,855 B1 | 4/2001 | Schneider | |
| 6,226,356 B1 | 5/2001 | Brown | |
| 6,240,177 B1 | 5/2001 | Guntzburger et al. | |
| 6,256,377 B1 | 7/2001 | Murphree et al. | |
| 6,263,047 B1 | 7/2001 | Randle et al. | |
| 6,263,048 B1 | 7/2001 | Nelson et al. | |
| 6,266,395 B1 | 7/2001 | Liu et al. | |
| 6,285,653 B1 | 9/2001 | Koeman et al. | |
| 6,292,468 B1 * | 9/2001 | Sanderson | 370/241 |
| 6,292,539 B1 | 9/2001 | Eichen et al. | |
| 6,349,130 B1 | 2/2002 | Posthuma et al. | |
| 6,366,644 B1 | 4/2002 | Sisk et al. | |
| 6,385,297 B2 | 5/2002 | Faulkner et al. | |
| 6,389,109 B1 | 5/2002 | Schmidt et al. | |
| 6,445,733 B1 | 9/2002 | Zuranski et al. | |
| 6,456,694 B1 | 9/2002 | Posthuma | |
| 6,463,126 B1 | 10/2002 | Manica et al. | |
| 6,466,647 B1 | 10/2002 | Tennyson | |
| 6,487,276 B1 | 11/2002 | Rosen et al. | |
| 6,507,870 B1 | 1/2003 | Yokell et al. | |
| 6,614,880 B1 | 9/2003 | Lysaght et al. | |
| 6,687,336 B1 | 2/2004 | Holeva | |
| 6,741,676 B2 | 5/2004 | Rudinsky et al. | |
| 6,781,386 B2 | 8/2004 | LeHenaff | |
| 6,970,415 B1 * | 11/2005 | Galarza et al. | 370/201 |
| 2002/0009155 A1 * | 1/2002 | Tzannes | 375/260 |
| 2002/0089999 A1 | 7/2002 | Binde | |
| 2003/0048756 A1 | 3/2003 | Chang et al. | |
| 2003/0095591 A1 * | 5/2003 | Rekai et al. | 375/225 |
| 2003/0108095 A1 * | 6/2003 | Duvaut et al. | 375/222 |
| 2004/0028189 A1 * | 2/2004 | Bauer et al. | 379/1.01 |

FOREIGN PATENT DOCUMENTS

| | | |
|---|---|---|
| WO | WO 91/11872 | 8/1991 |
| WO | WO 98/44428 A1 | 10/1998 |
| WO | WO 99/63427 A1 | 12/1999 |
| WO | WO 00/27134 | 5/2000 |
| WO | WO 00/64132 | 10/2000 |
| WO | WO 01/01597 A1 | 1/2001 |
| WO | WO 01/24490 | 4/2001 |
| WO | WO 01/67729 A1 | 9/2001 |

OTHER PUBLICATIONS

Backer, et al., "Telephone Access Network Measurements," 1998, Tektronix XP002148949.

Boets, et al. "The Modelling Aspect of Transmission Line Networks," May 12, 1992, pp. 137-141.

Chiu et al. "Loop Survey in the Taiwan Area and Feasibility Study for HDSL," IEEE, vol. 9, No. 6, Aug. 1991, pp. 801-809.

Eichen, et al., "DSTS: An Expert System for Diagnosis of Advanced Digital Subscriber Services," IEEE Network Operations and Management Symposium, U.S. NY, vol. Conf. 10, pp. 794-804.

Goralski, "xDSL Loop Qualification and Testing," IEEE Communications Magazine, May 1999.

Harris Communications, National Communications forum Presentation, Chicago, IL Oct. 5, 1998.

Harris White Paper, "Testing in the Unbundled Loop: The Challenge for ILECS and C:ECS". pp. 1-27.

Hedlund, et al., DSL Loop Test Telephony, vol. 235, No. 8, Aug. 24, 1998.

Heikman Product Information Release, "Introducing Hekimian's Comprehensive ADSL Test Solution,".

IEEE Std 743-1995 "IEEE Standard Equipment Requirements and Measurement Techniques for Analog Transmission Parameters for Telecommunications" 1996.

"Loop Qualification, Prerequisite for Volume xDSL Deployment," The TeleChoice Report on xDSL, vol. 2, No. 3, Mar. 1997.

"Network and Customer Installation Interfaces—Asymmetric Digital Subscriber Line (ADSL) Metallic Interface," ANSI T10413-1998. Revision of ASSI T1. 413-1995 (Not Published).

Stewart, "Testing ADSL: The Easier the Better, America's Network," Dec. 15, 1998 pp. 24-27.

Turnstone Systems, Inc., Product Literature and Presentation at Turnstone Systems, Inc., Sep. 1992.

Roehrkasten, "Meassung Von SDSL=Parametern", Nachrichtentechnik Electronik, DE Veb Verlag Technik . Berlin, vol. 48, No. 2, Mar. 1, 1998, pp. 20-21.

Rye Senjen et al, "Hybrid Expert Systems for Monitoring and for Diganosis", proceedings of the Conference on Artificial Intelligence for Applications, IEEE, Comp. Soc. Press. vol. Conf. 9, Mar. 1, 1993, pp. 235-241.

Woloszynski, "It's Here," Bellcore Exchange Magazine, Jun. 1998.

Zieman, "ADSL Line Qualification Tests," Online!, Wandel and Goltermann, http://www.wg.com/appnotes/adsltest.html.

* cited by examiner

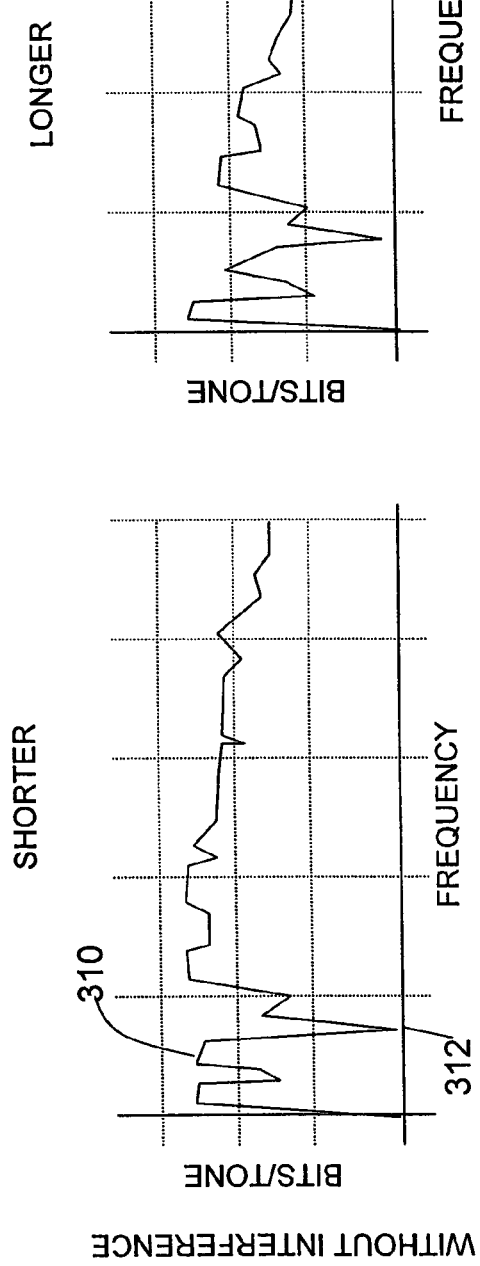
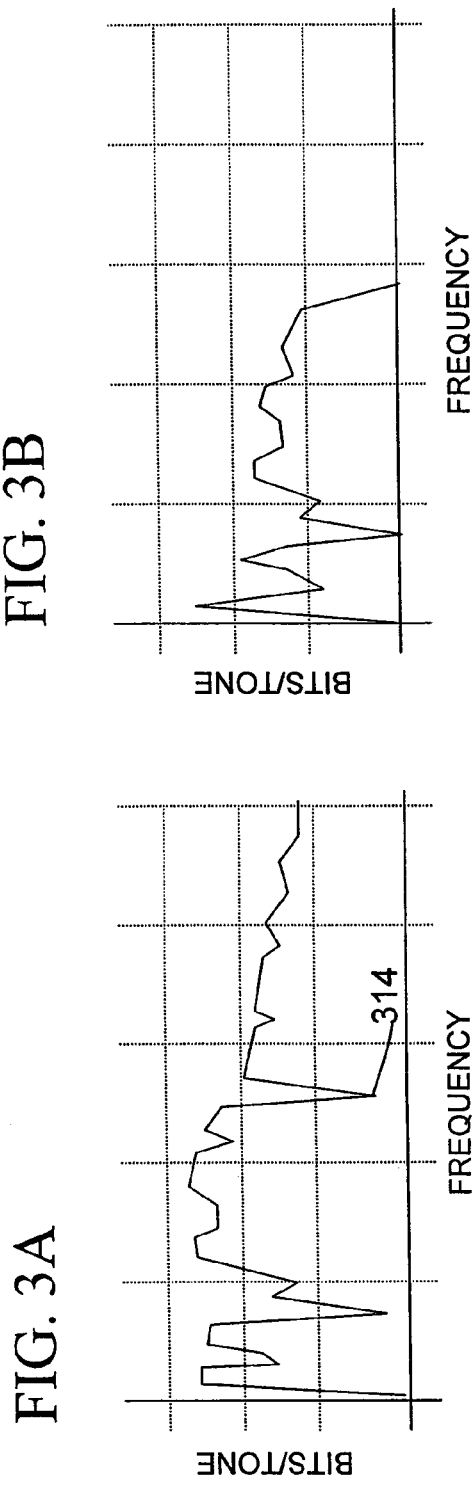
FIG. 3A  FIG. 3B  FIG. 3C  FIG. 3D

METHOD AND APPARATUS FOR IDENTIFYING FAULTS IN A BROADBAND NETWORK

BACKGROUND OF INVENTION

1. Field of Invention

This application relates generally to broadband networks and more particularly to identifying faults in a network.

2. Discussion of Related Art

In recent years, broadband networks have become widely deployed. Many businesses and homes have broadband network connections. Two popular types of broadband networks are ADSL and cable.

In these broadband networks, individual subscribers are generally connected to the network through an access network. In an ADSL network, the access network is usually physically implemented on twisted pair copper wires originally deployed for narrowband voice telephony. These wires are routed from a central office in cable bundles that each runs through a neighborhood or other portion of the service area for the network. Wires are tapped from the cable to make connection to individual homes or offices in the service area. A device at the central office is connected to the rest of the broadband network and can route signals from the network onto a particular subscriber line. In an ADSL network, this device is called a Digital Subscriber Line Access Multiplexer (DSLAM).

A cable network is conceptually similar, though implemented with different hardware. The broadband network includes many access networks through which subscribers are connected to the network. Subscribers in a particular neighborhood are connected through a common cable to a neighborhood router. Information on a cable network is transmitted using IP addressing, with each subscriber having its own IP address. In this way, each subscriber receives information directed to it as part of a "virtual" subscriber line.

The access portion of a network has traditionally been one of the most difficult parts of the network for a service provider to maintain. A network service provider might provide service to hundreds of thousands of subscribers. Clusters of subscribers will access the network through different access networks. Thus, there are many access networks that must be maintained. Further, the access networks are physically spread out over a wide area, exposing the access networks to significant potential for fault or interference. Furthermore, the geographical dispersion of the access networks also makes it expensive and difficult to identify and locate conditions that might affect service to users of the network.

Herein, an ADSL network will be used as an example of a broadband network. However, cable and other types of broadband networks exist and experience problems analogous to those encountered in ADSL networks.

Some service affecting conditions in an ADSL access network arise from physical problems in the line. For example, a bridged tap or a resistance imbalance, if present on the line, might decrease the rate at which data can be transmitted over the line. Likewise, sources of noise or interference might also impact performance. One such source of interference is crosstalk from lines in the cable bundle that carry other types of services. We anticipate, because of governmental regulation that forces the local telephone operating companies to make their networks open to any carrier that wants to use them, that there will be more instances of lines within a cable bundle carrying services that interfere with ADSL service.

It would be desirable for a network operator to be able to quickly identify service affecting conditions, including interference.

SUMMARY OF INVENTION

With the foregoing background in mind, it is an object to provide an efficient method for detecting service affecting conditions in an access network.

The foregoing and other objects are achieved in a network having a modem connected to each subscriber line. Information from the modem is used to identify service affecting conditions on the line. In one embodiment, the information from the modem is combined with information obtained from measuring electrical characteristics on the line to identify service affecting conditions. In another embodiment, the information from the modem describes the data transmission rate as a function of frequency.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A . . . 3D are a series of graphs useful in understanding the operation of an embodiment of the invention.

DETAILED DESCRIPTION

Figure 1:
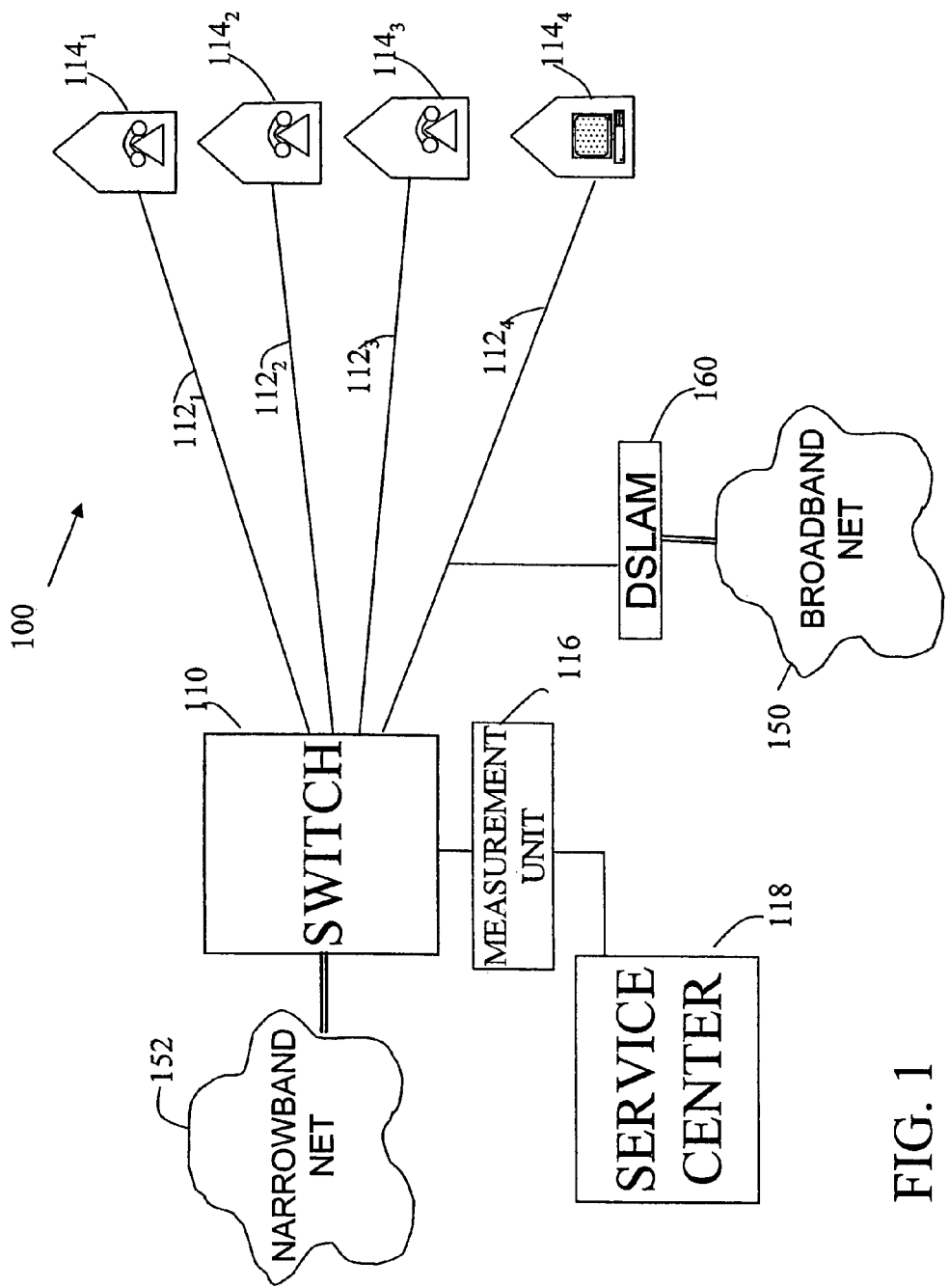
FIG. 1 is sketch illustrating a prior art access network.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 shows the access network 100 of a broadband network. In the illustrated example, broadband network is an ADSL network. In an ADSL network, the same physical lines as are used to deliver telephone services are often used for the access network. In FIG. 1 those lines are illustrated as subscriber lines $112_1 \ldots 112_4$. It will be appreciated that an access network would have many more subscriber lines, but only four are shown for simplicity.

Subscriber lines 112 connect user premises $114_1 \ldots 114_4$ to a switch 110. In the example of FIG. 1 subscriber premises $114_1$-$114_3$ receiving only plain old telephone service (POTS). But subscriber premises 114$_4$ is receiving broadband data services.

Switch 110 connects to a narrow band network 152. Switch 110 routes a telephone call carried over narrowband net 152 to an appropriate subscriber line.

The network also includes a measurement unit 116. Measurement unit 116 connects through switch 110 to any of the subscriber lines $112_1$-$112_4$. As is known in the art, measurement unit 116 can measure electrical properties on the subscriber lines. An example of a suitable measurement unit is the Celerity® product sold by Teradyne, Inc. of Deerfield, Ill.

Measurement unit 116 provides data to service center 118. Service center 118 could be a call center operated by the network operator. Though FIG. 1 shows service center 118 in a single location, it should be appreciated that service center 118 could contain many computers distributed over a network. Alternatively, service center 118 could be implemented as part of another network facility such as the network operations center.

Broadband services are provided to subscriber premises $114_4$ through subscriber line $112_4$. Accordingly, subscriber line $112_4$ is connected at its central end to broadband network 150. The connection is made through DSLAM 160.

Figure 2:
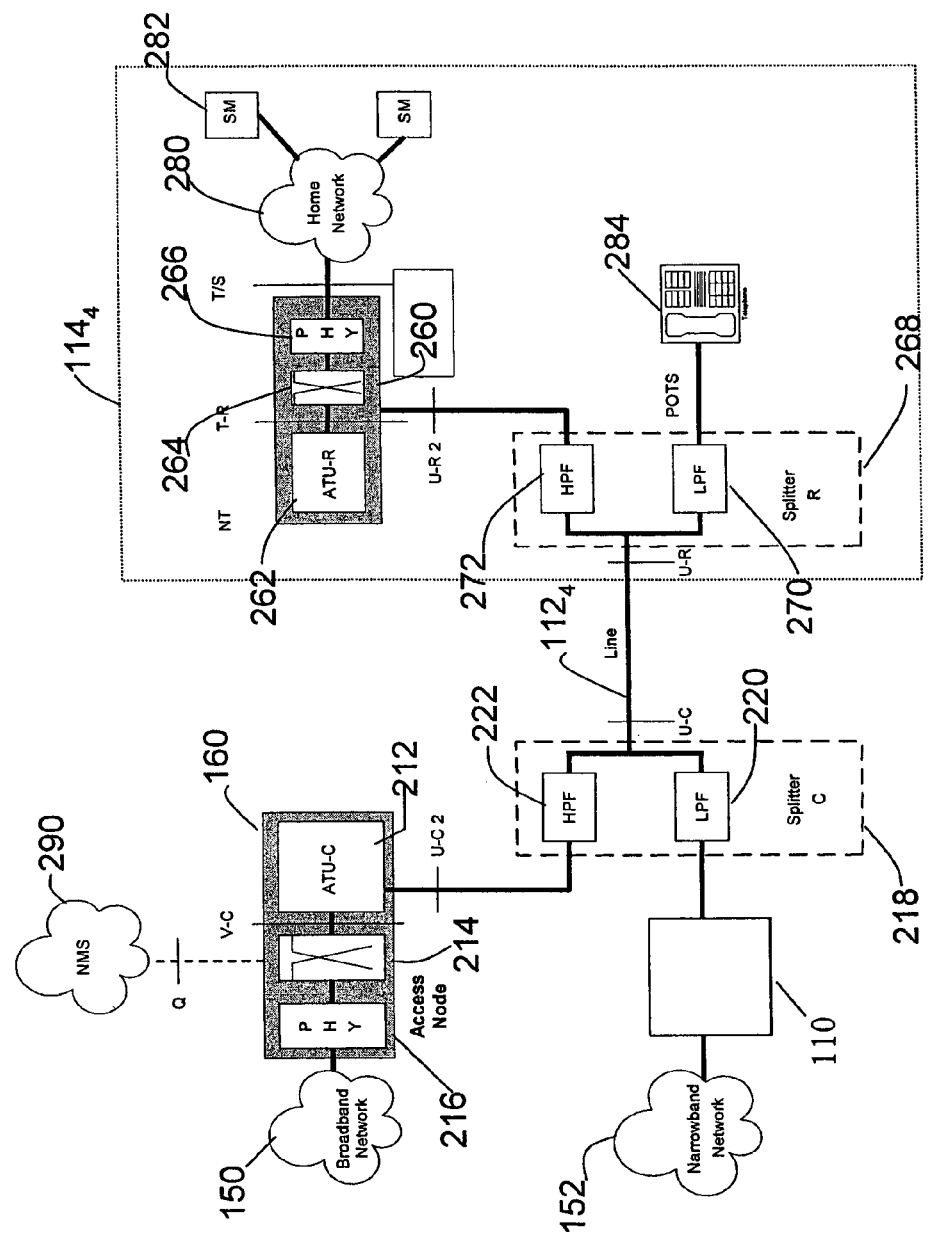
FIG. 2 is a sketch illustrating in more detail a portion of the access network of FIG. 1.

Returning to FIG. 2 additional details of the connections to subscriber line $112_4$ are shown. FIG. 2 shows that subscriber premises $114_4$ includes devices 282 that transmit and receive digital data over the broadband network. In a traditional setup, devices 282 could be personal computers.

Premises $114_4$ includes a premises splitter 268. Splitter 268 includes a low pass filter 270 that connects to a traditional telephone 284. Splitter 268 also includes a high pass filter 272 that connects to a network termination device 260. Splitter 268 ensures that low frequency signals, such as are used to carry telephone service, are routed to telephone 284 and higher frequency signals, such as those used to carry broadband data, are routed to network termination device 260.

Network termination device 260 is sometimes called a modem. It includes a transceiver unit 262. Herein the term "modem" will be used to generally refer to any device that transmits or receives information to or from the access network to establish communication between a subscriber and the broadband network.

Network termination device 260 might also include circuitry to perform dynamic channel allocation, such as multiplexer 264. For example, an ADSL modem might allocate data between 2 ATM channels to support dual latency (e.g. fast and interleaved) modes. However, such an element is not necessary to practice the invention.

Network termination 260 also includes a physical connection 266, here to a home network 280. The specific type of physical connection will depend on the type of devices at the premises connected to the network.

On the central side of the line, there is a corresponding central office splitter 218. Splitter 218 includes a low pass filter 220 and a high pass filter 222. Low pass filter 220 is connected to switch 110. Low pass filter 220 passes low frequency voice signals between switch 110 and subscriber line $112_4$. High pass filter 222 passes high frequency signals between DSLAM 160 and subscriber line $112_4$.

DSLAM 160 includes a corresponding transceiver 212. It also includes a device multiplexing device 214, similar to the multiplexer 264. DSLAM 160 also includes a physical connection 216 to the broadband network 150.

In operation, broadband information from the network 150 destined for premises $114_4$ passes through DSLAM 160 and is encoded at transceiver unit 212. This information passes through subscriber line $112_4$ where it is received by transceiver unit 266 inside network termination 260. The information is then converted into a form where it can be used within the home network 280. Likewise information from subscriber terminals 282 is passed through home network 280 to transceiver 262. Transceiver 262 puts the information in a form that can be transmitted over subscriber line $112_4$ to transceiver unit 212 inside the DSLAM. Transceiver 212 receives the information and allows DSLAM 160 to place it in a format that it can be transmitted over broadband network 150.

When information is provided from broadband network 150 through subscriber line $112_4$ to subscriber terminals 282, the access network is said to be providing data in a down stream direction. Conversely when information is generated at subscriber terminals 282 and pass through subscriber line $112_4$ to DSLAM 160, the access network is said to be operating in the upstream direction. In an ADSL network, the rate at which information is passed in the upstream direction is lower than the rate at which information is passed in the downstream direction.

FIG. 2 shows that DSLAM 160 is connected to network management system 290. Network management system 290 provides commands to DSLAM 160 to configure it for proper operation within the network. In addition, DSLAM 160 captures data about performance of the access portion of the network. This information can be passed to network management system 290.

FIGS. 3A-3D show graphs useful in understanding a preferred embodiment of the invention. FIG. 3A is a graph showing frequency along one axis. The other axis shows bits per tone. In an ADSL system, a range of frequencies is used to transmit information between transceivers 212 and 262. This range of frequencies is divided into frequency bins. In use, separate carrier signals are transmitted in each of the frequency bins. The frequency bins, or the carrier signals in the bins, are sometimes referred to as "tones."

To convey information, the carrier is modulated. The modulated carrier signal can take on one of a discrete number of modulation states. However, each carrier does not need to have the same number of modulation states.

The number of modulation states within each frequency bin is determined during a training sequence. When transceiver 262 and transceiver 212 initially establish communication, they go through a training sequence. The goal of the training sequence is to determine the maximum number of modulation states the carrier in each frequency bin can have in order to ensure reliable communication.

Different modulation states are created by changing some property of the carrier signal. In an ADSL system, modulation states are created by changing the amplitude and phase of the carrier. Each modulation state corresponds to a particular combination amplitude and phase of the carrier signal.

When a carrier has many modulations states, each modulation state looks similar to many others. Thus, even small distortions of the signal can cause the receiving transceiver to mistakenly identify the modulation state of the signal at the time it was transmitted. To reduce mistakes in identifying the information that was transmitted, the number of modulation states is reduced for tones that experience distortion.

The number of modulation states of the carrier indicates the number of bits of information that can be transmitted in that frequency bin in a single interval when data is transmitted. For example, when there are two modulation states, a single bit information can be transmitted. If four modulation states are used, two bits can be transmitted, etc. FIG. 3A shows a plot of the number of modulation states (in bits) for each tone. This plot represents what is called "bit density" for a particular communication link, such as subscriber line $112_4$. As can be seen, the number of bits per tone is different at different frequencies. Point 310 represents a frequency at which a relatively large number of bits are transmitted in the tone. Conversely, point 314 represents a tone at which a relatively small number of bits are transmitted in the tone. Point 310 corresponds to a tone which experiences little distortion or noise. Point 314 represents a tone which experiences a relatively high amount of distortion or noise.

FIGS. 3B, 3C, and 3D show similar plots of bit density taken under different conditions. FIGS. 3A and 3B represent lines that are generally not subject to outside interference. However, the pattern in FIG. 3B is representative of the bit density pattern on a longer line than in FIG. 3A. Longer lines attenuate the carrier signals more than shorter lines. Attenuation is most significant for higher frequency carriers. Because attenuation of the carrier reduces the ability of a receiver to discriminate between similar modulation states, each carrier can have fewer modulation states on longer lines. Thus, the bit density is lower on longer lines, particularly at high frequencies.

FIG. 3C represents the same line as in FIG. 3A, but with a bit density determined with a source of interference present. FIG. 3C is for purposes of example a plot of the bit density of a line when an idle T1 circuit is present in the same cable bundle as subscriber line $112_4$. The bit density pattern of FIG. 3C closely resembles the bit density pattern in FIG. 3A. However, there is a drop in the bit density pattern of FIG. 3C at point 314. In this example, point 314 represents the frequency bin containing 772 kHz. This dip is characteristic of the interference caused by an idle T1 circuit.

FIG. 3D shows the same line as in FIG. 3B. However, the plot in FIG. 3D is made with a source of interference present. As can be seen, the pattern in FIG. 3D generally tracks the pattern in FIG. 3B. However, the source of interference has reduced the bit density, particularly at higher frequencies.

We have discovered that different sources of interference will have different impacts on the bit densities of subscriber lines. We have also observed that the specific impact of a source of interference will depend on the length of the line. As will be described, we have used this recognition to develop a technique that can identify both whether a source of interference is present and the nature of that interference.

Figure 4:
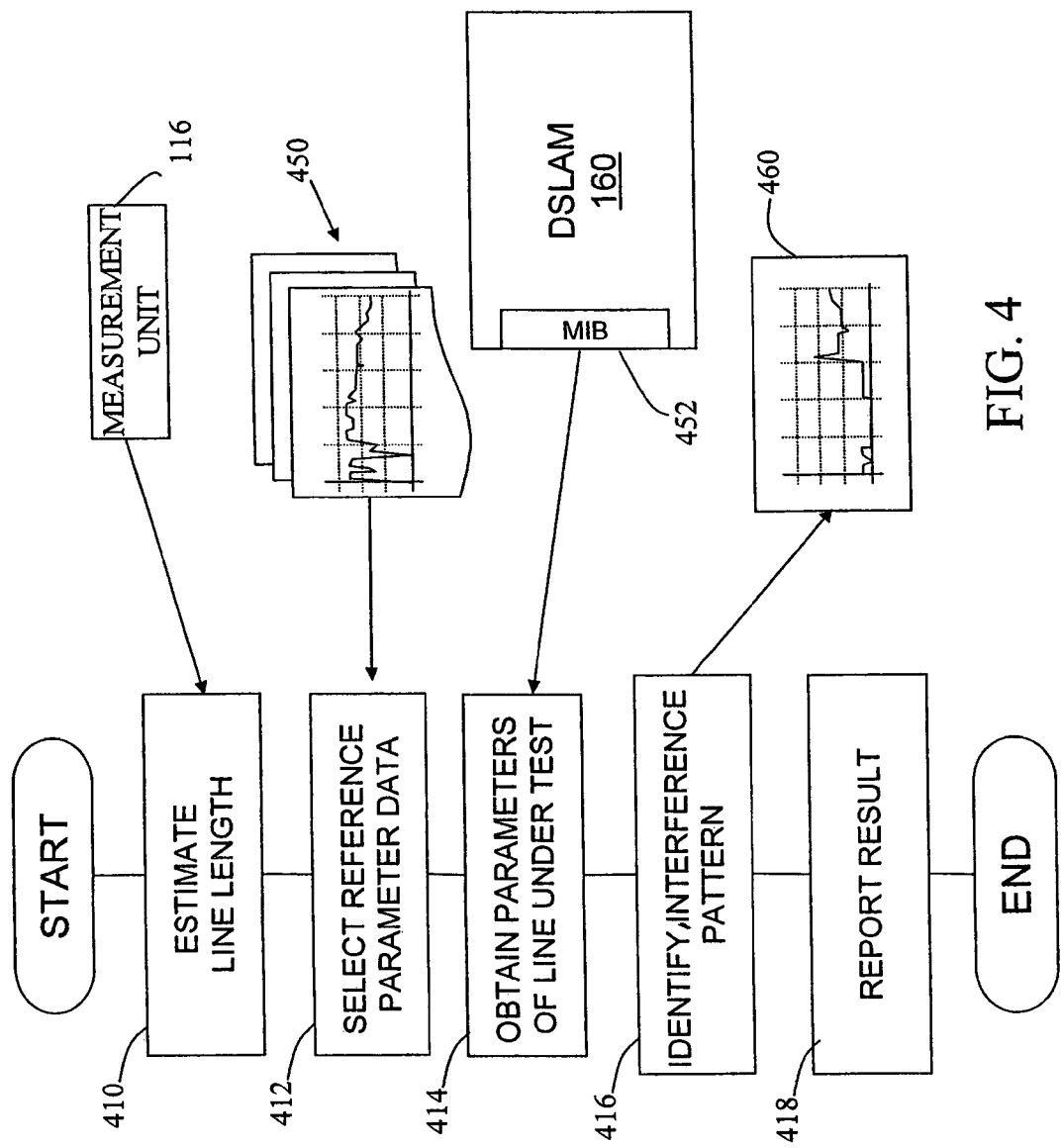
FIG. 4 is a flow chart illustrating the method employed in a preferred embodiment of the invention.

Turning to FIG. 4 the preferred embodiment of our technique is shown. In a preferred embodiment the process shown in FIG. 4 would be performed on a computer in service center 118. However, the specific way in which the process is performed is not critical to the invention and many alternatives are possible. In actual application, the specific data processing equipment to perform the process will depend on the intended use of the results.

FIG. 4 shows that the process begins at step 410 with an estimate of the line length. It should be appreciated that many processing steps are possible, but are not shown for clarity. For example, measurement unit 116 could be used to perform traditional metallic fault analysis. The Celerity system sold by Teradyne, Inc. can perform metallic fault analysis such as finding shorts, opens, crosses and resistive imbalance on the line. Depending on the condition of the line determined by measurement unit 116, it might be necessary or desirable to first repair the line. Alternatively, measurements of the electrical property of the line might be used at step 412 to alter the selection of reference data.

In the illustrated embodiment, the measurements obtained from measurement unit 116 are used only to estimate the length of the line. My currently pending patent application Ser. No. 10/176,014, entitled *System and Method for Prequalification of Telephone Lines for DSL Service Using an Average Loop Loss*, filed Jun. 20, 2002, which is hereby incorporated by reference, describes a method of estimating the length of a line which is particularly useful in an ADSL environment. However, alternative ways of estimating the line length are possible. A simple estimate of line length can be obtained by measuring the capacitance of the line. Alternatively it is not necessary for the estimate of the line length to be derived from measurements taken on the line. In some cases, a network operator will have records of the length of each subscriber line mode at the time the lines were installed. Estimating the line length from installation records is not a presently preferred embodiment because such records are often inaccurate.

As yet a further alternative, it is possible that the length of the line could be estimated from information derived from DSLAM 160. As transceivers 212 and 262 send information back and forth over line $112_4$, they can measure the amount that each signal is attenuated by the line. Because the attenuation on a line is generally related to its length, this attenuation information can be used to estimate the length of the line as well. Information on line attenuation can be obtained from DSLAM 160 through network management system 290. Where attenuation information from DSLAM 160 is used to estimate the length of the line, it is preferable that the attenuation of the upstream link be used for the computation. We have observed that the relationship between line length and attenuation is measured by at least some DSLAMs is less linear for the downstream link then the upstream link.

A simple way to determine the relationship between attenuation measured by a particular DSLAM 160 and the length of the line is to make a series of empirical measurements using a test setup. Preferably, the relationship is determined for many different kinds of DSLAMs. If DSLAM data is used at step 410 to estimate the length of the line, the stored data for the particular type of DSLAM 160 attached to the subscriber line $112_4$ being tested would be accessed.

Once the length of the line is estimated, processing proceeds to step 412. At step 412 reference parameter data is selected. In the embodiment of FIG. 4 the parameters being analyzed are the bit density pattern of the line. As shown in FIGS. 3A and 3B, the bit density of a line depends on the length of the line. Thus an appropriate set of reference data is selected, representing a line of the estimated length. For use as a reference, the data should represent a line without interference. In a preferred embodiment, the referenced data is stored as a "library" 450 in a computer in service center 118.

The process proceeds to step 414. At step 414 corresponding parameters for the line under test are determined. Here the information on the line under test is obtained from DSLAM 160. As shown in FIG. 1, DSLAM 160 has an interface shown as MIB 452 through which a network management system 290 can obtain information from DSLAM 160.

Networks in widespread use today are implemented according to standards. The standards define the interfaces that every network element must implement. In this way, someone building a network can assemble a network from components manufactured by different sources, but the elements will all work together in the network. The standard interfaces also allow different network elements to easily interact. For example, a computer within service center 118 can easily access parameters concerning the operation of a DSLAM 160 through MIB 452.

The standards define the minimum information that must be available through an interface. Many manufacturers of equipment implement additional features through an interface. For example, the bit densities pictured in FIG. 3 are not part of the information that must be made available through MIB 452 as part of the ADSL standard. However, some manufacturers of DSLAMs make this information available through optional interfaces. One of the most widely used DSLAMs is the ASAM series from Alcatel. The information on bit densities pictured in FIG. 3 is available through the TL1 interface to the ASAM series DSLAM.

Once parameter data is obtained for the line under test, processing proceeds to step 416. At step 416 an interference pattern is identified. In the preferred embodiment, an interference pattern is determined by comparing the parameters of the line under test with the reference data. In frequency bins where the line under test has a lower bit density than the reference, the difference can be attributed to a source of interference. Element 460 represents this difference pattern. Here element 460 is shown as a graph. Element 460 will preferably be implemented as a data set in the memory of a computer executing step 416. The data set might include a series of points that represents points on the curve pictured as element 460. However, any convenient method for representing the information pictured in the graph of element 460 could be used.

At step 418 results of analysis on the collected data are reported. The form of the results will depend on the intended use of the information obtained. In a simple form, the interference pattern such as pictured in 460 might be reported. However, it is not necessary that the results be reported in graphical form. For example, step 418 may report only whether there is or is not a source of interference on the line under test. Such a determination might be made by recognizing either a significant number of frequency bins in which the actual measured parameters differ from the referenced parameters or frequency bins in which there is a significant deviation between the measured parameters and the referenced parameter. In the presently contemplated embodiment, the degree of difference that constitutes a significant difference is determined empirically under controlled conditions in a laboratory setting before the program that executes step 418 is written.

As yet a further example of the results that might be reported at step 418, the results might include a report on the type of interference source present. As described above in connection with FIG. 3, interference caused by an idle T1 circuit will create a spike in the interference pattern at a frequency of approximately 772 kHz. Different types of interference sources will create different interference patterns. By matching the interference pattern obtained to interference patterns created by known types of interference, the specific source of interference might be identified. In the presently preferred embodiment, interference patterns associated with specific interference sources are determined before step 418 is programmed. Interference patterns can be recognized from data gathered when investigating and repairing lines actually displayed that experienced interference problems or from measurements on lines in a laboratory to which interference was added. In one embodiment, the interference patterns will be modem specific meaning that different DSLAMs might respond to the same interference source differently and step 418 will be programmed to match the measured interference pattern to know interference patterns resulting from the DSLAM and/or DSLAM-modem pair on the line under test.

Another example of a source of interference that might be identified is an E1 interferer that would create a drop in performance around 1.024 MHz or an HDSL that creates a drop in performance in the 0 to 392 kHz range.

It should be appreciated that FIG. 4 illustrates the process of identifying interference as a multistep process in which measurements are compared to a reference to create a difference signal. The difference signal is then analyzed to look for patterns characteristic of interference sources. The steps are explained separately in connection with FIG. 4 as an aid to understanding the invention. However, it should be appreciated that the process might be performed in other orders or that the steps might be combined. For example, line library 450 might contain parameter data for lines of varying lengths that include sources of interference. In this case, rather than computing the difference between the measured parameters and a selected one of the referenced parameters in library 450, the analysis step would be based on finding the reference parameter data in line library 450 that most closely matches the measured parameter data. Cross-correlation based analysis of signals is known in the art as a way to recognize certain patterns in signals and could be used to identify sources of interference from the parameters.

Also, it should be appreciated that analysis of a signal does not need to include analysis of all of the frequencies. Some sources of interference impact transmission over a limited range of frequencies. When identifying whether such sources of interference are present, analysis can be simplified by looking for a pattern indicative of interference over only that range of frequencies.

Furthermore, it should be appreciated that the analysis would not necessarily be graphical. Line library 450 and interference pattern 460 are represented graphically partially as an aid in understanding the theoretical operation of the invention. It is possible that the comparisons could be made using a set of rules or data tables. For the example of an idle T1 circuit creating interference, a rule might be in the form of: If the number of bits in the frequency bin including 772 kHz is less then 40 percent of the number of bits in the reference, indicate an idle T1 circuit. More generally, some sources of interference might be identified if the line performance parameters in certain frequency ranges are below some threshold.

The invention was described in connection with an ADSL network. The process described herein is not limited to use in such networks. For example, cable networks also include modems in central locations in an access network that communicate with subscribers. These modems also include interfaces for providing network management information. In the same way that information was obtained through MIB 452 of DSLAM 160, parameters on the operation of the access network in a cable network can be obtained from a cable modem.

Having thus described several aspects of at least one embodiment of this invention, it is to be appreciated various alterations, modifications, and improvements will readily occur to those skilled in the art. For example, it was described above that reference data was selected at step 412 based on the length of the line. However, any available information might be used to select the reference data. For example, measured resistive imbalance or defected bridged tops might drive the selection of reference data. In this case, reference library 450 would include representations of lines with of different lengths and different physical characteristics. Such alterations, modifications, and improvements are intended to be part of this disclosure, and are intended to be within the spirit and scope of the invention.

As another example, it was described that the performance of the line is analyzed by obtaining the bit rate per tone in a DMT system. However, corresponding analyses could be performed using other per-tone information. Other DMT parameters could be used to perform the analysis. Possibly, a computer in service center will be programmed to perform the analysis as using multiple types of DMT parameters. The specific analysis used would depend on which DMT parameters were readily available from the modems in the access network under test. Examples of other DMT parameters that might be made available by a modem include signal to noise ratio per tone and attenuation per tone.

Accordingly, the foregoing description and drawings are by way of example only.

What is claimed is:

1. A method of identifying service affecting conditions in the access portion of a network through which a plurality of subscribers are connected to a central point, with a modem at the central point and a modem at the remote point of the connection to each subscriber, the method comprising:
   a) obtaining measurements of the electrical characteristics of a subscriber line via a switch connected to an end of the subscriber line opposite the subscriber;
   b) obtaining information from a modem connected to the subscriber line between the switch and the subscriber concerning the performance of the subscriber line; and
   c) using in combination the measured electrical characteristics and the information from the modem to identify a service affecting condition.

2. The method of claim 1 wherein the subscriber line comprises a telephone line carrying DSL service.

3. The method of claim 2 wherein the DSL service is ADSL.

4. The method of claim 1 wherein the subscriber line comprises a virtual line created by a connection in a local loop of a cable system.

5. The method of claim 1 wherein the modem information is obtained through a standardized interface of the modem.

6. The method of claim 1 wherein the step of using in combination comprises using the measured electrical characteristics to determine a reference and the service affecting conditions are identified by comparing the modem information to the reference.

7. The method of claim 6 wherein the electrical measurements indicate the length of the subscriber line.

8. The method of claim 7 wherein the modem information provides the bit loading and the reference is selected from a set that includes bit loadings for lines of different lengths.

9. The method of claim 1 wherein the service affecting condition is a source of interference.

10. The method of claim 1 wherein the step of using in combination comprises using the measured electrical characteristics to select a reference representing a line without the service affecting condition present.

11. The method of claim 1 additionally comprising reporting the results of identifying a service affecting condition.

12. The method of claim 11 wherein reporting includes reporting whether a source of interference is present on the subscriber line.

13. The method of claim 11 wherein reporting includes reporting on the type of interference source present.

14. The method of claim 11 wherein reporting comprises providing a graph of the difference between a reference set of parameters and the measured parameters on the subscriber line.

15. The method of claim 1 wherein the modem at the central point and the modem at the remote point communicate information by modulating a plurality of tones and the information concerning the performance of the subscriber line includes a plurality of per-tone pieces of information on the performance of the subscriber line, each piece of information corresponding to one of the tones.

16. The method of claim 15 wherein identifying a service affecting condition includes comparing the per-tone performance information and reference per-tone information.

17. A method of identifying service affecting conditions in the access portion of a network through which a plurality of subscribers are connected to a central point disposed between a switch and a remote point, with a modem at the central point and a modem at the remote point of the connection to each subscriber, with the switch operable for connecting the remote point of the connection to each subscriber to a narrowband network, and with the modem at the central point operable for coupling the remote point of the connection to each subscribe in communication with a broadband network, the method comprising:
   a) obtaining information from the modem connected to the subscriber line at the central point between the switch and the remote point concerning the data transmission rate as a function of frequency of the subscriber line;
   b) analyzing the data transmission rate as a function of frequency to determine whether it contains a pattern indicative of a service affecting condition; and
   c) identifying a service affecting condition on the subscriber line when a pattern associated with that service affecting condition is identified.

18. The method of claim 17 wherein the pattern for the same service affecting condition is different for subscriber lines of different lengths.

19. The method of claim 17 additionally comprising determining the length of the subscriber line and selecting a pattern indicative of a service affecting condition includes selecting a pattern based on the length of the line.

20. The method of claim 17 wherein the subscriber line is an ADSL line and the length of the ADSL line is estimated from the upstream attenuation obtained from a modem connected to the subscriber line.

21. The method of claim 17 wherein the service affecting condition is interference.

22. The method of claim 21 additionally comprising identifying the source of interference.

23. The method of claim 17 wherein the subscriber line is an ADSL line and the service affecting condition is selected from a set of conditions that includes an idle T1 circuit in the same cable bundle.

24. A method of identifying service affecting conditions in the access portion of a network through which a plurality of subscribers are connected to a central point disposed between a switch and a remote point, with a modem at the central point and a modem at the remote point of the connection to each subscriber that communicate by modulating a plurality of tones, with the switch operable for connecting the remote point of the connection to each subscriber to a narrowband network, and with the modem at the central point operable for coupling the remote point of the connection to each subscriber in communication with a broadband network, the method comprising:
   a) obtaining per-tone information from the modem connected to the subscriber line at the central point between the switch and the remote point indicating performance of the line for each of a plurality of tones;
   b) analyzing the per-tone information as a function of frequency to determine whether it contains a pattern indicative of a service affecting condition; and
   c) identifying a service affecting condition on the subscriber line when a pattern associated with that service affecting condition is identified.

25. The method of claim 24 wherein the per-tone information is bit rate per tone.

26. The method of claim 24 wherein the per-tone information is signal to noise ratio per tone.

27. The method of claim 24 wherein the per-tone information is attenuation per tone.

* * * * *